United States Patent
Samueli et al.

(10) Patent No.: US 6,178,198 B1
(45) Date of Patent: *Jan. 23, 2001

(54) APPARATUS FOR, AND METHOD OF, PROCESSING SIGNALS TRANSMITTED OVER A LOCAL AREA NETWORK

(75) Inventors: Henry Samueli, Northridge; Fang Lu, Irvine; Avanindra Madisetti, Torrance, all of CA (US)

(73) Assignee: Broadcom Corproation, Irvine, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/970,557

(22) Filed: Nov. 14, 1997

(51) Int. Cl.[7] .................................................. H03K 3/11
(52) U.S. Cl. ...................... 375/214; 375/232; 375/233; 375/286; 375/355
(58) Field of Search .................................. 375/214, 232, 375/233, 348, 355, 222, 229, 286; 708/322, 323

(56) References Cited

U.S. PATENT DOCUMENTS

| | | | |
|---|---|---|---|
| 3,962,637 | 6/1976 | Motley et al. ........................... 375/42 |
| 4,597,089 | 6/1986 | Motley et al. ........................... 375/13 |
| 4,599,732 | 7/1986 | LeFever ................................... 375/13 |
| 4,864,590 | 9/1989 | Arnon et al. ............................. 375/14 |
| 5,003,555 | 3/1991 | Bergmans ................................ 375/12 |
| 5,031,194 | * 7/1991 | Crespo et al. ......................... 375/230 |
| 5,065,412 | 11/1991 | Schenk ................................... 375/111 |
| 5,230,012 | 7/1993 | Schenk ................................... 375/111 |
| 5,276,711 | 1/1994 | Rossi ...................................... 375/106 |
| 5,444,712 | 8/1995 | Betts et al. ........................... 370/110.1 |
| 5,559,840 | 9/1996 | Melas et al. ............................ 375/355 |
| 5,604,741 | 2/1997 | Samueli et al. ........................ 370/402 |
| 5,617,450 | * 4/1997 | Kakuishi et al. ...................... 375/230 |
| 5,638,409 | * 6/1997 | Awata et al. .......................... 375/355 |
| 5,724,397 | * 3/1998 | Torsti ...................................... 375/355 |
| 5,748,674 | * 5/1998 | Lim ....................................... 375/233 |

OTHER PUBLICATIONS

Joshi, Robindra B. et al., "WP 4.2: A 100 MHz, 5MBaud QAM Decision–Feedback Equalizer for Digital Television Applications" 1994 IEEE International Solid–State Circuits Conference, ISSCC94/Session 4/Video and Communication Signal Processors/Paper WP 4.2 pp. 68–69.

Martin, James et al., "Local Area Networks Architectures and Implementations" Second Edition, 1994, pp. 167–170, 204.

(List continued on next page.)

Primary Examiner—Amanda T. Le
(74) Attorney, Agent, or Firm—Christie, Parker & Hale, LLP (57) ABSTRACT

Digital signals provided by a repeater connected to a plurality of clients by unshielded twisted wire pairs, are converted to analog signals which become degraded during transmission through the wires. Clients convert the degraded analog signals to digital signals. Digital signal phases are coarsely adjusted to have assumed zero crossing times coincide in-time with a clock signal zero crossing. Signal polarity, and the polarity of any change, is determined at the assumed zero crossing times of the digital signals. Precursor and post-cursor responses, resulting from signal degradation, are respectively inhibited by a feed forward and a decision feedback equalizer. The time duration of post-cursor response is further inhibited by a high pass filter and a tail canceller. Phase adjustments are made, after response inhibition, by determining the polarity, and the polarity of any change, at the assumed zero crossing times. Before phase adjustments are made, a phase offset is provided in order to compensate for phase degradations introduced by the unshielded twisted wire pairs.

51 Claims, 6 Drawing Sheets

OTHER PUBLICATIONS

Razavi, James et al., "Monolithic Phase–Locked Loops and Clock Recovery Circuits" IEEE Press, 1996, Tutorial pp. 2–7.

Anderson, John B., "Digital Transmission Engineering" IEEE Press, 1999, Synchronization—Chapter 4, pp. 193–199.

* cited by examiner

APPARATUS FOR, AND METHOD OF, PROCESSING SIGNALS TRANSMITTED OVER A LOCAL AREA NETWORK

This invention relates to systems for, and methods of, providing for the transmission and reception of signals through unshielded twisted pairs of wires between a repeater and a plurality of clients. The invention particularly relates to systems for, and methods of, using digital techniques for enhancing the recovery, and the quality of such recovery, of the analog signals passing through the unshielded twisted pairs of wires to the client so that the information represented by such analog signals will be accurately recovered at the client.

BACKGROUND OF THE INVENTION

In a hub-and-spoke network topology, a repeater resides on a hub. The repeater facilitates an exchange of data packets among a number of clients. A client can be a computer, a facsimile machine, another computer, etc. The repeater serves several ports where each port is connected to an individual one of the clients with a separate point-to-point link between the repeater and such client.

In a 100BASE-TX signalling protocol, unshielded twisted pairs of wires constitute the point-to-point link between the repeater and each of the clients. Each link consists of two pairs of unshielded twisted wires. One pair of the unshielded twisted wires provides for a transmission of data from the repeater to an individual one of the clients. The other pair of the unshielded twisted wires provides for a transmission of data from the individual one of the clients to the repeater.

When information is illustratively transmitted from the repeater to an individual one of the clients in a 100BASE-TX system, the information is originally in digital form. The digital information may represent individual ones of a plurality of analog levels. Specifically, in a 100BASE-TX System, the digital signals may represent analog levels of +1, 0 and −1.

The digital information at the repeater may be converted to analog form and then transmitted in analog form through the unshielded twisted pair of wires to the individual one of the clients. The transmitted signals are received in analog form at the individual one of the clients. The received signals are then processed to recover the transmitted information represented by the analog information.

The distance between the repeater and the individual one of the clients may be as great as one hundred meters. The unshielded twisted pair of wires coupling the repeater and the individual one of the clients produces a degradation in the characteristics of the signals as the signals pass through the unshielded twisted pair of wires. The amount of the degradation rapidly increases with increases in the length of the unshielded twisted pair of wires connected between the repeater and the individual one of the clients.

The degradation results in part from Inter Symbol Interference (ISI), signal attenuation, crosstalk, clock jitter and a number of other factors. Such degradation severely distorts the transmitted data signals. The degradation also results in part from the fact that the analog information transmitted from the repeater to the individual one of the clients is also received at the other clients connected to the repeater and is reflected back to the repeater, thereby affecting the characteristics of the signals transmitted from the repeater to the individual one of the clients.

Analog techniques have been used in the prior art to process the analog signals received at the individual one of the clients. These analog techniques have not been completely effective in eliminating the degradation or distortions in the signals received at the individual one of the clients. This has caused errors to be produced in the information received and processed at the individual one of the clients. This has been true even though the 100BASE-TX system provides substantially greater noise immunity than other types of systems and is able to handle smaller signal levels than other types of systems.

BRIEF DESCRIPTION OF THE INVENTION

This invention relates to a system for, and method of, converting analog signals received at a client from a repeater to corresponding digital signals. The digital signals are processed to shift the times for the production of the digital signals so that the digital signals are produced at the zero crossings of clock signals having a particular frequency. The digital signals are also processed to determine at each instant the magnitude of the digital signals closest to the magnitude representing individual ones of a plurality of amplitude levels such as +1, 0 and −1 and to then convert such magnitude to such closest one of such amplitude levels. In this way, the information represented by the transmitted signals is accurately recovered at the client.

In one embodiment of the invention, digital signals provided by a repeater connected as by unshielded twisted pairs of wires to a plurality of clients are converted to analog signals. The analog signals become degraded during transmission through the wires. At the client, the degraded analog signals are converted to digital signals. Initially, the phases of the digital signals are coarsely adjusted to have the times assumed for a zero crossing of the digital signals coincide in time with the zero crossing of a clock signal. This phase adjustment is made by determining the polarity, and the polarity of any change, in the digital signals at the time assumed to be the zero crossings of the digital signal.

Subsequently the pre-cursor and post-cursor responses (resulting from the signal degradations) in the digital signals are respectively inhibited by a feed forward equalizer and a decision feedback equalizer. A high pass filter and a tail canceller also inhibit the post-cursor response of the digital signals by limiting the time duration of the post-cursor response.

Phase adjustments are made in the resultant digital signals, after the inhibition in the pre-cursor and post-cursor responses, by determining the polarity, and the polarity of any change, in the digital signals at the times assumed to be the zero crossings of the digital signals. However, before any phase adjustments are made, a phase offset is provided in the digital signals to compensate for phase degradations produced in the signals passing through the unshielded twisted pairs of wires.

Although the invention is discussed in this application with reference to the 100BASE-TX system, it will be appreciated that the invention is not limited to the 100BASE-TX system. For example, the invention is applicable to any 100BASE-TX system. The invention is also applicable to other systems.

DETAILED DESCRIPTION OF THE INVENTION

The discussion in this specification may be considered to relate specifically to a 100BASE-TX system for the purposes of explanation and understanding of the invention. However, it will be understood that the concepts of this invention and the scope of the claims apply to other types of systems than the 100BASE-TX system. For example, the concept of this invention and the scope of the claims apply to any 100BASE-TX system. For example, the concepts of the invention and the scope of the claims also apply to other systems than 100BASE-TX systems.

Figure 1:
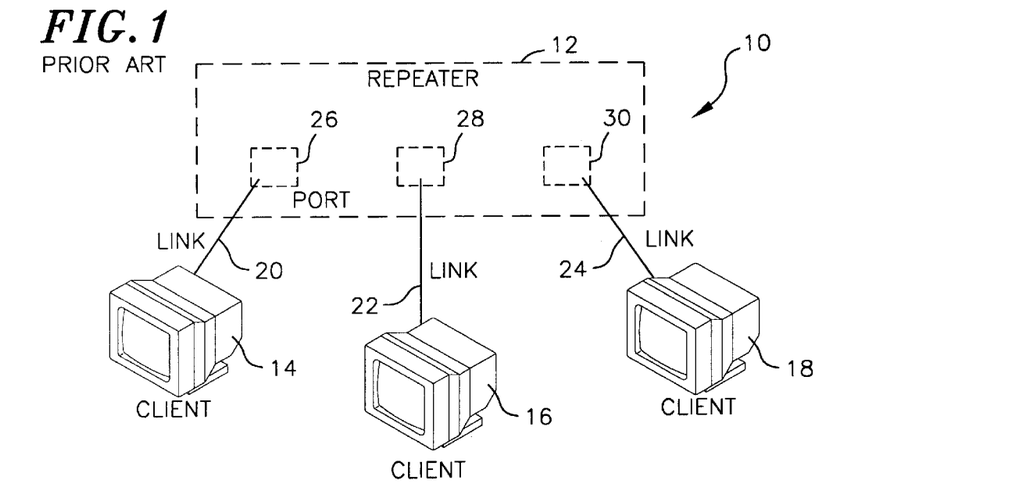
FIG. 1 is a schematic diagram, primarily in block form, of a system known in the prior art and including a repeater, a plurality of clients and a plurality of links (e.g., unshielded twisted pairs of wires) each connected between the repeater and an individual one of the clients.

FIG. 1 illustrates a system, generally indicated at 10, of the prior art. The system includes a repeater 12 and a plurality of clients 14, 16 and 18. The repeater 12 facilitates the exchange of data packets between the repeater and the clients 14, 16 and 18 and among the clients. Each of the clients 14, 16 and 18 may be a computer, a facsimile machine, another repeater or a number of other different types of equipment. The clients 14, 16 and 18 may be respectively connected to the repeater 12 as by cable or links 20, 22 and 24. The cables or links 20, 22 and 24 may be respectively connected to ports 26, 26 and 30 in the repeater 12.

Although the following discussion relates to the transfer of information from the repeater 12 to individual ones of the clients 14, 16 and 18, it will be appreciated that the information transfer may be from individual ones of the clients 14, 16 and 18 to the repeater 12 without departing from the scope of the invention. Furthermore, a different number of clients than three (3) may be connected to the repeater 12 without departing from the scope of the invention.

The cables or links 20, 22 and 24 may constitute pairs of unshielded twisted wires. Two pairs of such wires may be provided between the repeater 12 and each individual one of the clients 14, 16 and 18. One pair of such wires provides for a transmission of information from the repeater 12 to the individual one of the clients 14, 16 and 18. The other pair of such wires provides for the transmission of information from the individual one of the clients 14, 16 and 18 to the repeater 12.

In the prior art, each of the links 14, 16 and 18 severely distorts the transmitted data packets. The amount of the degradation rapidly increases with increases in the length of the link. The degradation results from Inter Symbol Interference (ISI), signal attenuation, crosstalk, clock jitter, etc. Therefore, an adaptor is provided to couple data reliably to and from the link. The adaptor provides the interface to a computer on one side (e.g., ISA, EISA, PCI, etc.) of the adaptor and to the links such as the link 14 on the other side of the adaptor. It can also include circuitry such as a transducer to transmit data to, and receive data from, a link such as the links 14, 16 and 18.

Figure 2:
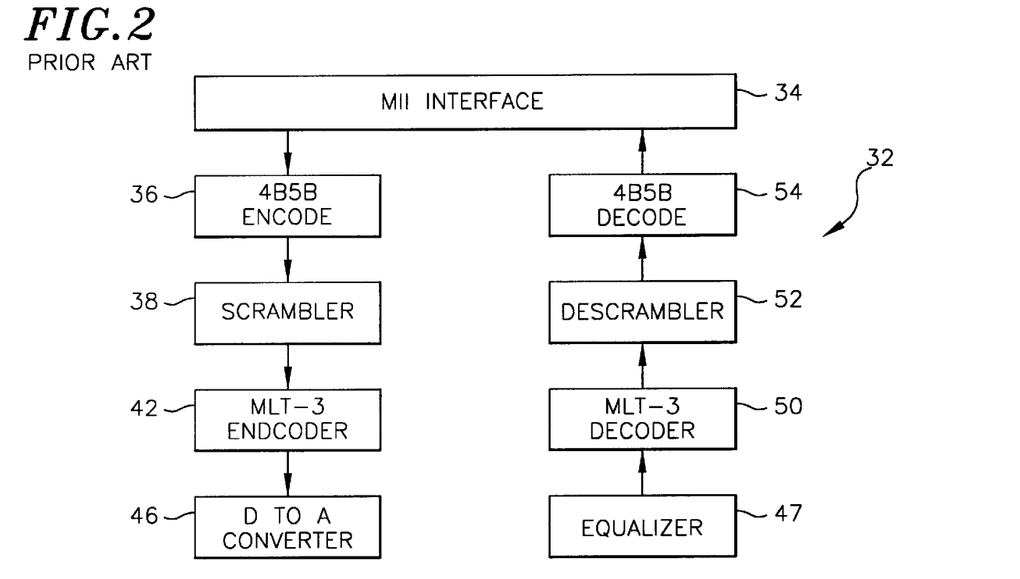
FIG. 2 is a schematic diagram, primarily in block form, of a system known in the prior art for encoding information in digital form at the repeater, converting the digital information to analog information at the repeater, transmitting the analog information to a client, converting the analog information to digital information at the client and decoding the digital information at the client to recover the transmitted information.

A transceiver generally indicated at 32 is shown in FIG. 2 and is known in the prior art with respect to most of the blocks shown in FIG. 2. The transceiver 32 includes a standard connector designated as a Media Independent Interface (MII) 34. The Media Independent Interface 34 may be a four (4)-bit wide data path in both the transmit and receive directions. Clocked at a suitable frequency such as 25 MHz, it results in a net throughput in both directions of data at a suitable rate such as 100 Mb/sec. It provides a symmetrical interface in both the transmit and receive directions and may have a total of forty (40) clock, data and control pins.

The input data passes through the Media Independent Interface 34 in FIG. 2 to a 4B5B Encoder 36. The input data is grouped into nibbles (or groups of four (4) bits each). Each 4-bit nibble is then encoded to produce a five (5)-bit symbol. The 4B5B encoding was originally provided to (1) maintain dc balanced codes—in other words, equal numbers of 1's and 0's, (2) introduce redundancy so that control information can be distinguished from data, and (3) provide sufficient transitions to facilitate clock recovery. A consequence of 4B5B encoding is that the data rate increases to a suitable rate such as 125 Mb/sec. and the coding efficiency is reduced to eighty percent (80%) because of this increase in data rate without a corresponding increase in the amount of data processed.

The 5B encoded symbols from the encoder 36 are introduced to a scrambler 38 in FIG. 2. The 5B encoded symbols are scrambled to ensure that the transmitted spectrum complies with the Federal Communications Commission (FCC) mandates on EMI. The scrambler 38 may be a maximal-length Pseudo Noise (PN) sequence generator with a period of 2047 bits. It is generated by an 11-b linear feedback shift register (LFSR). The output bits from the scrambler 38 are generated recursively as X(n)=X(n−11)+X(n−9). The pseudo-random bit stream produced by the scrambler 38 is exclusive-or'd with the transmit datastream. Scrambling destroys the dc balance and transition properties of the 5B codes.

Figure 3:
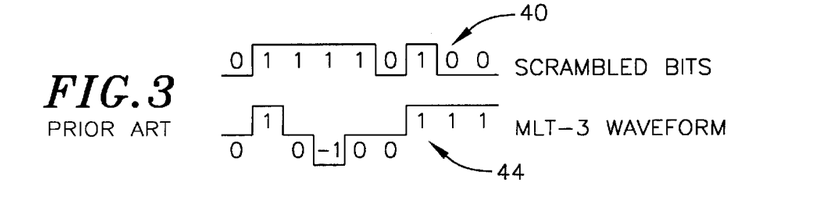
FIG. 3 is a schematic diagram showing how digital bits of information are scrambled at the receiver in the prior art and how the scrambled bits are encoded at the repeater to a sequence of bits having a plurality of amplitude levels such as +1, 0, and −1.

The scrambled bits are indicated schematically at 40 in FIG. 3. The scrambled bits 40 are encoded by an MLT-3 encoder 42 to produce bits indicated at 44 in FIG. 3. The scrambled bits 40 provide a binary 1 when a transition is to be made in the amplitude level between symbol values of +1, 0 and −1. If a scrambled bit is a 0, the amplitude level of the previous bit in the sequence 44 is retained. By controlling the transitions (not allowing a direct transition between states +1 and −1), MLT-3 signalling limits the maximum frequency to 31.25 MHz (Nyquist frequency is 62.5 MHz).

The signals from the MLT-3 encoder 42 are introduced to a digital-to-analog converter 46 and the resultant analog signals are passed through one of the links such as the link in FIG. 1. The signals at the other end of the link such as the link 20 are then processed by an analog equalizer 47 and the resultant signals are introduced to an MLT-3 decoder 50. The MLT-3 decoder operates to decode the signals previously encoded by the MLT-3 encoder 42. The decoded signals then pass to a descrambler 52 which operates to descramble the signals previously scrambled by the scrambler 38. A 4B5B decoder then operates to decode to four (4) bits the five (5) bit encoding provided by the encoder 36. The signals in the four (4) bit format then pass to the Media Independent Interface 34.

Figure 4:
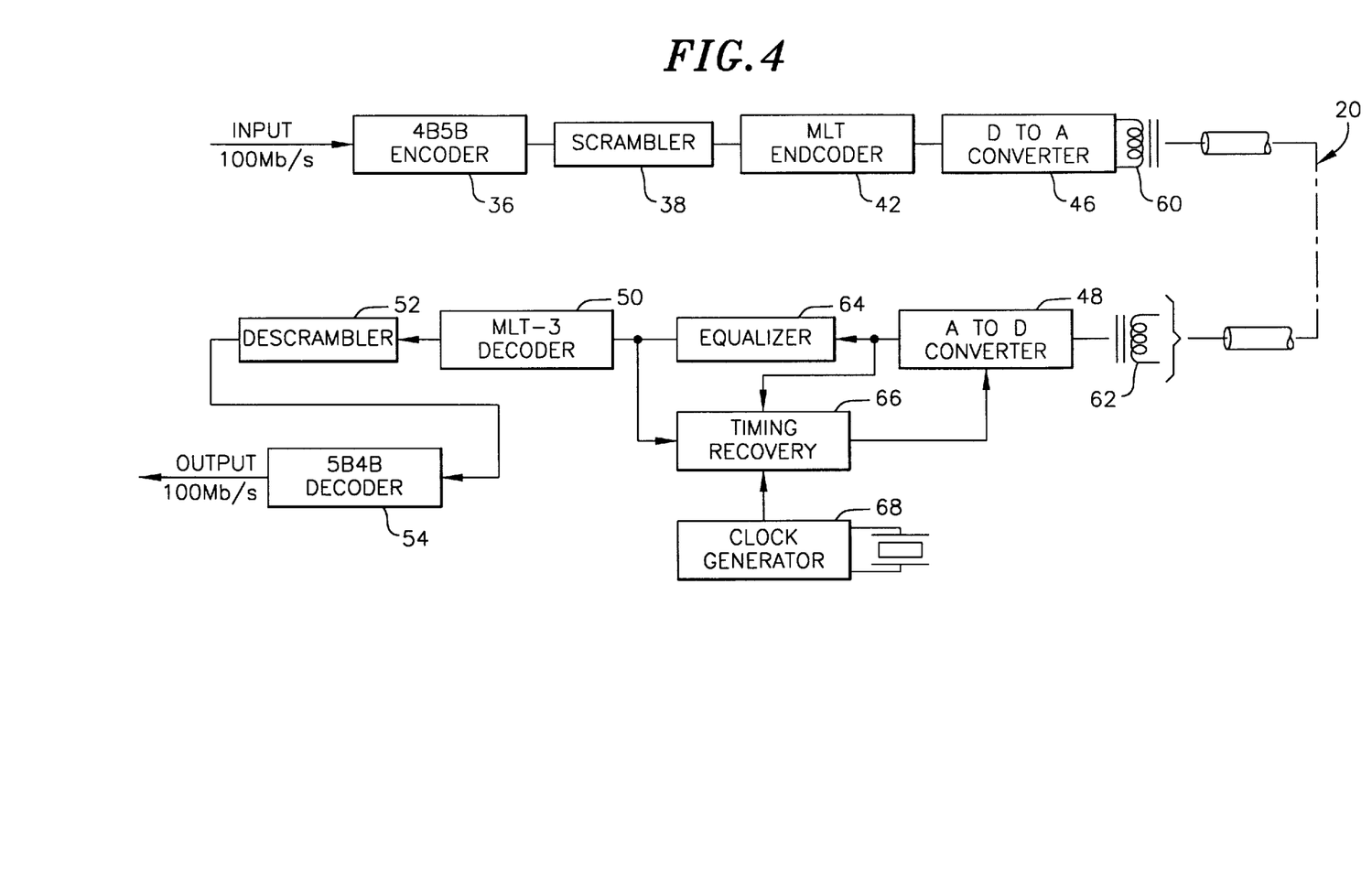
FIG. 4 is a circuit diagram, primarily in block form, of a system known in the prior art for encoding information in digital form and transmitting the information in an analog form to a client and of a system included as one embodiment of the invention for digitally processing the analog signals received at the client to recover the encoded information.

The signals passing through the link such as the link 14 in FIG. 1 have not been converted in the prior art to the digital form such as provided as at 48 in FIG. 4 in the embodiment of this invention. Instead, the signals passing through the link such as the link 20 have been processed in the prior art in the analog form. This has prevented the distortions produced in the links such as the link 20 from being eliminated to the extent that they are eliminated when the signals are processed in the digital form as in the embodiment of this invention. Furthermore, as will be seen from the subsequent discussions, applicants use individual techniques in this invention to process the signals in the digital form. These individual techniques have not been provided in the prior art. These individual techniques cause the information represented by the digital signals to be recovered with an enhanced accuracy relative to that obtained in the prior art.

FIG. 4 illustrates a circuit diagram, primarily in block form, of applicants' invention when incorporated in the prior art system shown in FIG. 2. In FIG. 4, the blocks common to the blocks shown in FIG. 2 are given the same numerical designations as the corresponding blocks shown in FIG. 2. However, additional blocks are shown in FIG. 4 and these are given individual identifications in FIG. 4. These include a transformer 60 between the digital-to-analog converter 46 and the link 20 and a transformer 62 between the link 20 and the analog-to-digital converter 48.

A block generally indicated at 64 and generically designated as an equalizer receives the output of the analog-to-digital converter 48 in FIG. 4. The equalizer 64 is shown in detail in FIG. 5 and will be described in detail subsequently. The digital signals from the analog-to-digital converter 48 are also introduced to a timing recovery stage 66, the output of which passes to the analog-to-digital converter 48 to control the operation of the converter. The operation of the timing recovery stage 66 is controlled by a clock signal generator 68 which generates clock signals at a particular frequency such as approximately 125 MHz. The operation of the clock signal generator 68 may be crystal controlled as at 70. In addition to receiving inputs from the analog-to-digital converter 48, the timing recovery stage receives as an input the output from the equalizer 64. The output of the equalizer 64 also passes to the MLT-3 decoder 50 also shown in FIG. 2.

As previously indicated, the MLT-3 encoder 42 provides digital signals at a suitable frequency such as approximately 125 MHz. These signals are converted to analog signals by the converter 46. After being introduced to the transformer 60, the analog signals are passed through the link such as the link 20 to the transformer 62, which introduces the signals to the analog-to-digital converter 48.

Figure 9:
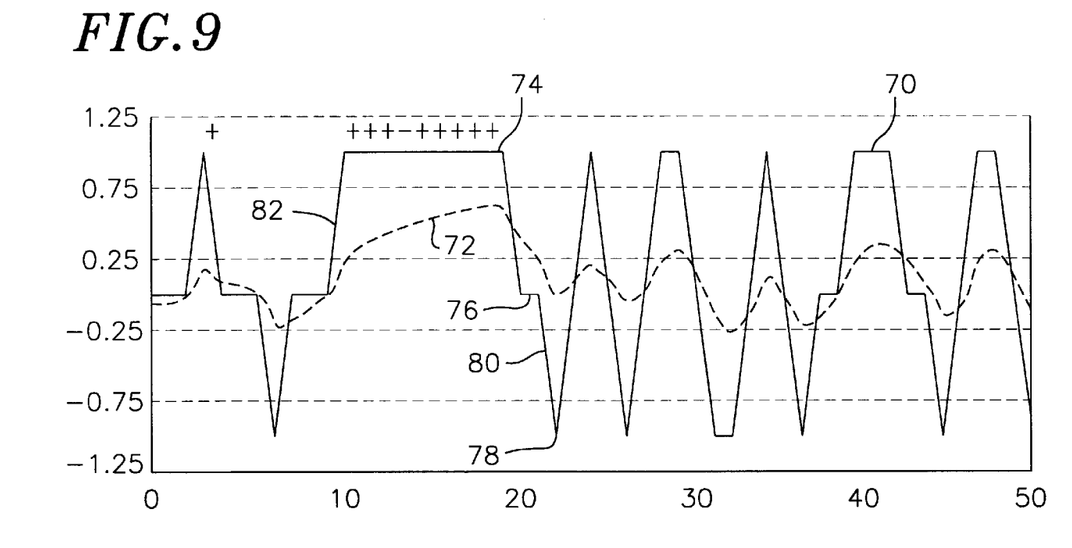
FIG. 9 shows curve illustrating the pattern of digital signals encoded at the repeater at the different amplitude levels such as +1, 0 and −1 and the pattern of the analog signals received at the client as a result of such encoding at the repeater.

FIG. 9 illustrates at 70 the signals produced by the MLT encoder 42. As will be seen, the signals from the encoder 42 have at each instant one of three (3) amplitude levels such as +1, 0 and −1 to represent information. FIG. 9 also illustrates at 72 the signals received at the analog-to-digital converter 48. As will be seen, there is a considerable degradation or distortion of the signals 72 relative to the signals 70. This degradation is produced in the link 20 and is also produced because of the interference provided by the signals in the links 22 and 24.

It is desirable for the converter 48 to sample the analog signals at the zero crossing and peak amplitude of the waveform 70. In this way, the converter 48 will provide an indication of the amplitude level of the encoded signals from the encoder 42. For example, if the converter 48 samples the analog signals in FIG. 9 at the times indicated at 74, 76 and 78, the converter will produce digital signals respectively representing the analog levels +1, 0 and −1. However, if the converter 48 samples the signals at a time indicated at 80 or at a time indicated at 82, the converter will produce digital signals which may not represent the proper one of the analog levels +1, 0 and −1. This may cause errors to be produced in the reproduction of the information represented by the digital signals produced by the converter 48.

The timing recovery stage 66 operates at a suitable frequency such as approximately 125 MHz to produce digital signals having amplitudes corresponding to the magnitudes of the analog signals 72 in FIG. 9 at the instants of conversion. The timing recovery stage 66 operates to adjust the times that the digital signals are produced by the converter 48 so that these signals occur at the zero crossings and the peak amplitudes of the waveform 70. In this way, the digital signals will be produced by the converter 48 at times such as the times 74, 76 and 78 in FIG. 9 rather than at times such as the times 80 and 82 in FIG. 9.

Figure 10:
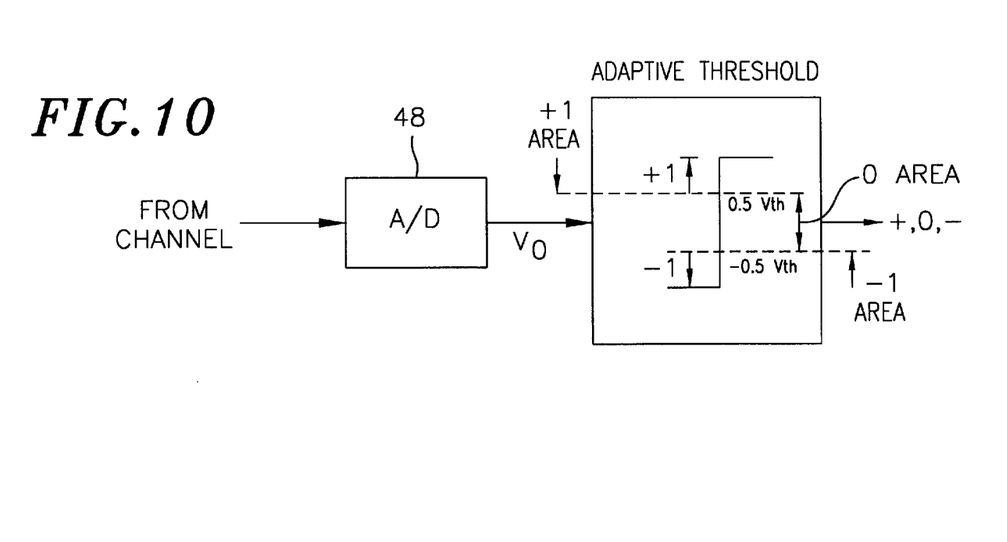
FIG. 10 illustrates the adaptive thresholds for controlling whether the digital signals produced at each instant at the client represent individual ones of a plurality of amplitude levels such as +1, 0 and −1.

FIG. 10 illustrates how the timing recovery stage 66 initially operates to determine whether each digital conversion has an amplitude level representing +1, 0 or −1. For an analog voltage between −0.5 volts and +0.5 volts, the amplitude level of the digital conversion of this analog voltage is initially assumed to be 0. For an analog voltage with a positive value greater than +0.5 volts, the amplitude level of the digital conversion of the analog voltage initially is assumed to be +1. When the analog voltage has a negative value with an absolute magnitude greater than 0.5 volts, the amplitude level of the digital conversion of the analog voltage is initially assumed to be −1. These assumptions are made because of the considerable distortion in the characteristics of the signals 72 (FIG. 9) introduced to the converter 48 relative to the characteristics of the signals 70 produced by the encoder 42.

Figure 11:
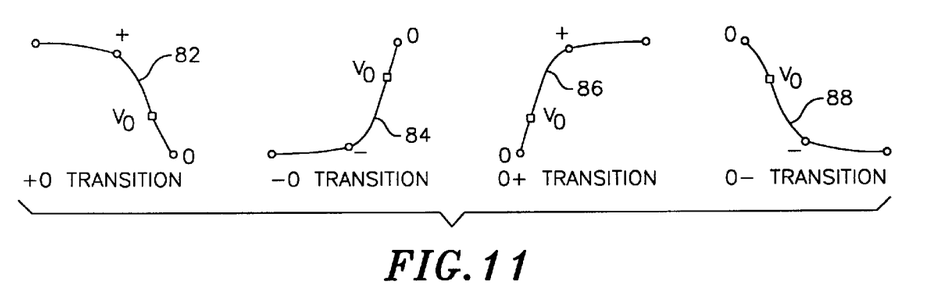
FIG. 11 shows different timing relationships between (a) a voltage assumed at the client to be at a zero crossing in the production of digital signals at the client and (b) a zero crossing of a clock signal at a particular frequency, these timing relationships being used to adjust the time at which the voltage is assumed to be at the zero crossing.

FIG. 11 indicates how phase adjustments are initially made for different operating conditions to have the time assumed by the converter 48 for the zero crossing of the digital voltage $V_o$ coincide in time with the time for the zero crossing of the clock signals from the clock generator 68. FIG. 11 indicates four (4) different conditions in which phase adjustments are made in the time assumed by the converter 48 for the zero crossing of the digital voltage. For each of these four (4) conditions, the indication "0" represents the time at which the clock signal from the clock signal generator 68 crosses the zero line. Furthermore, for each of these four (4) operating conditions, $V_o$ indicates the voltage which is actually produced by the analog-to-digital converter 48 at the time assumed by the converter to constitute the time at which a zero crossing occurs.

As will be seen in FIG. 4, the digital signals from the analog-to-digital converter 48 are shown as being introduced directly to the timing recovery stage 66. This occurs before the equalizer 64 becomes operative to determine whether each of the digital signals from the converter 48 has an amplitude level of +1, 0, or −1. The digital signals from the converter 48 are initially processed by the timing recovery stage 66 because no significant information is obtained from the operation of the equalizer 64 until a coarse adjustment has been provided by the timing recovery stage in the times for the production of the voltage $V_o$.

The first condition in FIG. 11 is designated as "+0 transition." In this condition, the voltage $V_o$ is positive as indicated by a "+" sign above and to the left of the "$V_o$" designation. Furthermore, the $V_o$ voltage occurs before the "0" voltage indicating the time at which the clock signals from the generator 68 cross the zero line. As shown in the curve at the left in FIG. 11, the voltage decreases from $V_o$ to the "0" line crossing. Under such conditions, the time for the production of the digital signals by the converter 48 would be moved to the right—or, from a time standpoint, delayed—in FIG. 11 to have the $V_o$ indication coincide in time with the "0" indication.

If the $V_o$ voltage should be negative with the same shape of curve as shown in the "+0" transition in FIG. 11, the $V_o$ voltage would be below and to the right of the "0" indication. Under such circumstances, the time for the production of the digital signals by the converter 48 would be moved to the left—or, from a time standpoint, advanced—in FIG. 11 to have $V_o$ coincide in time with the "0" indication.

The condition second from the left in FIG. 11 is designated as "−0 transition." In that condition, $V_o$ is below the "0" indication from a voltage standpoint and occurs to the left—or, from a time standpoint, before—the "0" indication. Furthermore, the $V_o$ voltage is negative as indicated by a "−" sign to the left and below the "0" and "$V_o$" indications. Under such circumstances, the voltage $V_o$ is moved to the right—or, from a time standpoint, delayed—to have the $V_o$ indication coincide in time with the "0" indication.

If the $V_o$ indication should be positive with the same shape of curve as shown in the "−0" transition in FIG. 11, the $V_o$ voltage would be above and to the right of the "0" indication. Under such circumstances, the production of the voltage $V_o$ would be moved to the left by the converter 48—or, from a time standpoint, advanced—in FIG. 11 to have $V_o$ coincide in time with the "0" indication.

The third condition in FIG. 11 is designated as a "0+" transition. In that condition, the "0" indication is below and to the left—or, from a time standpoint, before—the $V_o$ indication. In other words, $V_o$ is positive relative to the "0" indication. This is indicated by a "+" sign above and to the right of the $V_o$ indication. Under such circumstances, the production of the $V_o$ indication would be moved to the left—or, from a time standpoint, advanced—in FIG. 11 to have $V_o$ coincide in time with the "0" indication.

If the $V_o$ indication should be negative with the same shape of curve as shown in the "0+" transition in FIG. 11, the $V_o$ voltage would be below and to the left of the "0" indication. Under such circumstances, the time for the production of the digital signals by the converter 48 would be moved to the right—or, from a time standpoint, delayed—in FIG. 11 to have $V_o$ coincide in time with the "0" indication.

The fourth condition in FIG. 11 is designated as a "0−" transition. In that condition, the "0" indication is above and to the left—or, from a time standpoint, before—the $V_o$ indication. In other words, $V_o$ is negative relative to the "0" indication. This is indicated by a "−" sign below and to the right of the $V_o$ indication. Under such circumstances, the timing of the $V_o$ indication would be moved to the left—or, from a time standpoint, advanced—in FIG. 11 to have $V_o$ coincide in time with the "0" indication.

If the $V_o$ indication should be positive with the same shape of curve as shown in the "0−" transition in FIG. 11, the $V_o$ voltage should be above and to the left of the "0" indication. Under such circumstances, the production of the digital signals by the converter would be moved to the right—or, from a time standpoint, delayed—in FIG. 11 to have $V_o$ coincide in time with the "0" indication.

Figures 5, 6:
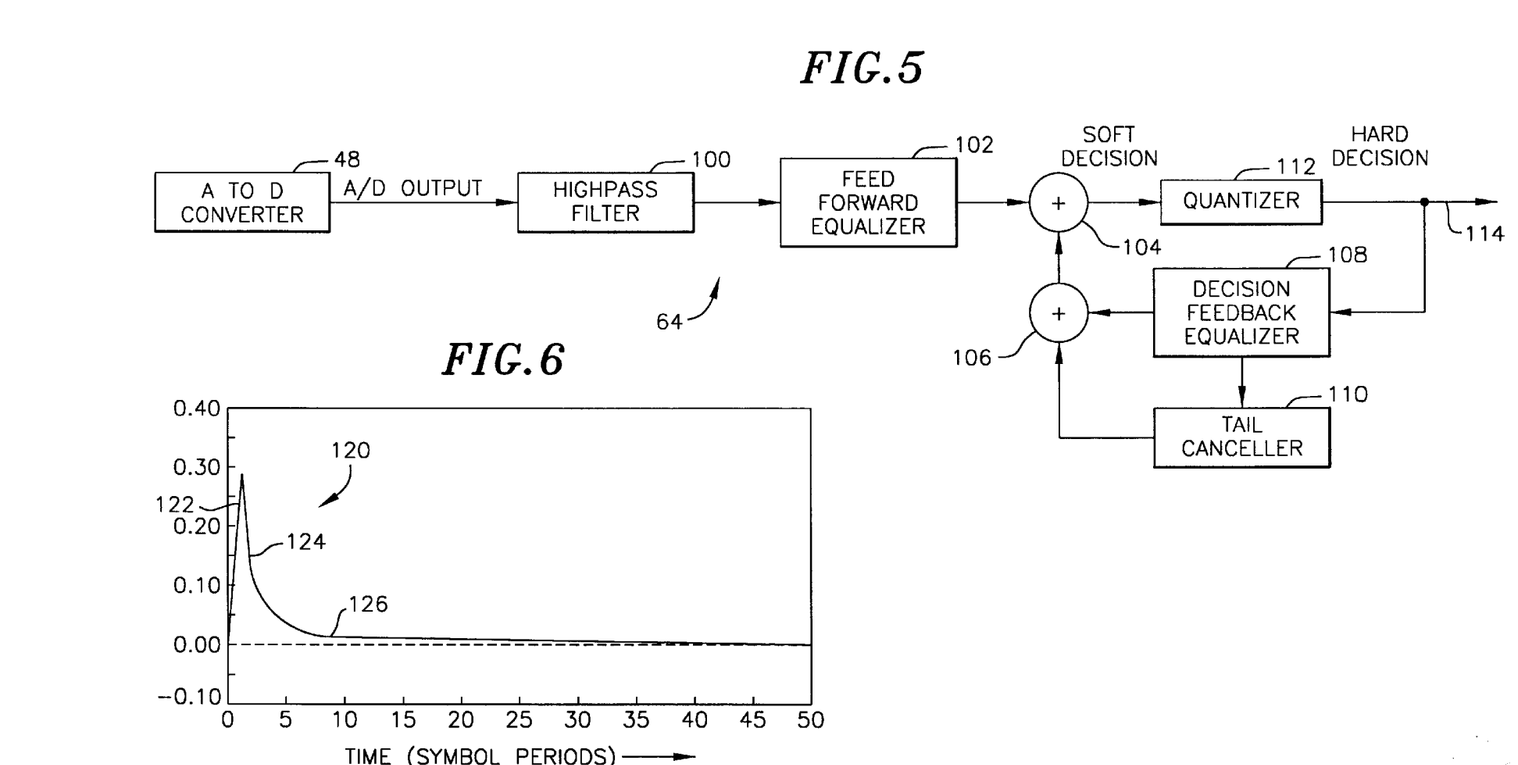
FIG. 5 is a circuit diagram, primarily in block form, of a system, including equalizers, for inclusion in the embodiment shown in FIG. 4 to process digitally the analog signals received at the client and to produce signals representative of individual ones of the plurality of amplitude levels such as +1, 0 and −1.
FIG. 6 is a curve schematically illustrating the pulse response of a link (e.g. unshielded twisted pairs of wires) connected between the repeater and the client in the system shown in FIGS. 4 and 5.

After the time of the $V_o$ indication has been adjusted as shown in FIG. 11 and discussed above to have it coincide in time with the "0" indication, the digital signals from the analog-to-digital converter 48 are introduced to the equalizer 64 in FIG. 4. The equalizer 64 is shown in detail in FIG. 5. In FIG. 5, the signals from the analog-to-digital converter 48 are introduced to a high pass filter 100. The signals from the high pass filter 100 in turn pass to a feed forward equalizer 102. A feed forward equalizer such as the equalizer 100 is known in the prior art. The signals from the feed forward equalizer 102 are introduced to an adder 104 which also receives signals from an adder 106.

The adder 106 receives the outputs from a decision feedback equalizer 108 and from a tail canceller 110. A decision feedback analyzer such as the equalizer 100 is known in the prior art. The signals from the decision feedback equalizer 108 are also introduced to the tail canceller 110. Signals are introduced to the decision feedback equalizer 108 from a quantizer 112. The quantizer 112 receives the output from the adder 104. The quantizer 112 (also known as a slicer) is known in the art.

Figure 7:
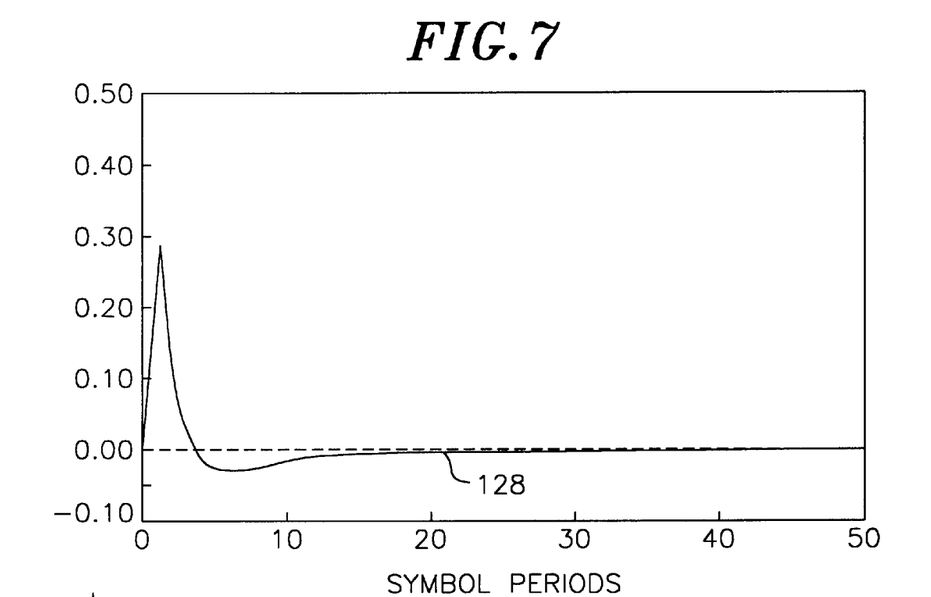
FIG. 7 is a curve similar to that shown in FIG. 6 and illustrates the response of the system after an operation of a high pass filter included in the embodiment shown in FIG. 5 in limiting the length of a tail in the cable response shown in FIG. 6.

A feed forward equalizer, a decision feedback equalizer and a slicer are shown in FIG. 7 and are disclosed in U.S. Pat. No. 5,604,741, issued to Henry Samueli, Mark Berman and Fan Lu on Feb. 18, 1997, for an "Ethernet System" and assigned of record to the assignee of record of this application. Reference is made to U.S. Pat. No. 5,604,741 if any additional disclosure is necessary to complete the disclosure of the feed forward equalizer 102, the decision feedback equalizer 108, the quantizer 112 and the adder 104 in this application.

As will be seen in FIG. 6, a composite signal generally indicated at 120 is shown as being comprised of a left portion 122 and a right portion 124. Each of the portions 122 and 124 has distortions. The distortions in the left portion 122 may be considered as a pre-cursor response. The distortions in the right portion 124 may be considered as a post-cursor response. The distortions result in part from the fact that the digital signals representing information or data develop tails as they travel through the unshielded twisted pairs of wires defined as the links 20, 22 and 24. The distortions also result in part from the reflections from the links 20, 22 and 24 to the repeater 12 in FIG. 1.

The feed forward equalizer 102 may be considered to correct for distortions (or pre-cursor responses) in the portion 122 of the composite signal 120. The decision feedback equalizer 124 may be considered to correct for distortions (or post-cursor responses) in the portion 124 of the composite signal 120. As will be seen in FIG. 6, the distortions (or post-cursor response) in the portion 124 of the composite signal 120 result in a tail 126. This tail extends for a considerable period of time as indicated by the number of taps along the horizontal axis in FIG. 6. If corrections had to be provided for as many as fifty (50) taps to eliminate or significantly reduce the tail 126, this would unduly complicate the construction of the decision feedback equalizer 64 in FIG. 4.

To simplify the construction of the equalizer 64 in FIG. 4, the high pass filter 100 and the tail canceller 110 are included in the embodiment of the equalizer as shown in FIG. 5. The high pass filter 100 operates to block the passage of the low frequency signals which constitute a significant portion of the tail 126. As a result of the operation of the high pass filter 100, the length of the tail 126 is significantly reduced as indicated at 128 in FIG. 7. As will be seen schematically by a comparison of FIGS. 6 and 7, the number of taps is reduced from approximately fifty (50) in FIG. 6 to approximately (twenty) 20 in FIG. 7 because of the inclusion of the high pass filter 100 in FIG. 5.

Figure 8:
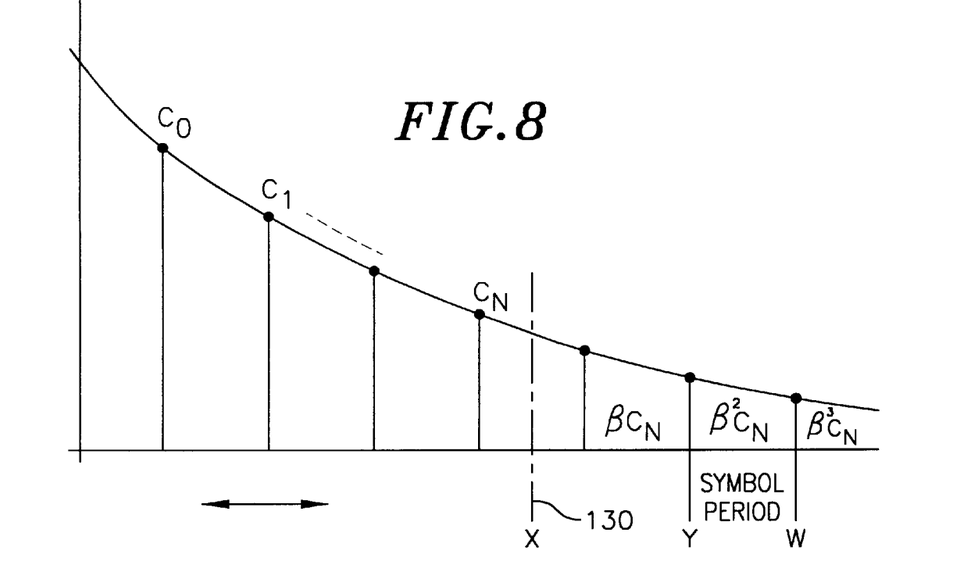
FIG. 8 is a curve similar to that shown in FIGS. 5 and 6 and illustrates the response of the system after an operation of a tail canceller included in the embodiment shown in FIG. 5 in limiting the length of the tail in the cable response shown in FIG. 6.

The tail canceller 110 reduces the number of taps required in the decision feedback equalizer. This may be seen from FIG. 8, which illustrates the tail on an enlarged schematic basis. As shown in FIG. 8, the tail decays substantially on an exponential basis from a position 130 which is the last tap of the decision feedback equalizer. This exponential decay is predictable. The tail canceller 110 accurately predicts the shape of this exponential decay and provides a cancellation of this exponential decay The tail canceller 110 may constitute a first order recursive filter.

The output from the equalizer 64 in FIG. 4 is obtained from the quantizer 112 in FIG. 5. The quantizer 112 provides a plurality (e.g. 3) of progressive amplitude values and determines the particular one of the three (3) amplitude values closest to the output from the adder 104 for each of the digital signals produced by the converter 48. The quantizer 112 provides this output on a line 114 for each of the digital signals to indicate the data or information represented by such digital signals. In this way, the equalizer 64 in FIG. 4 restores the analog levels of the digital signals to the analog levels of these digital signals at the repeater 12 even with the distortions produced in these signals as they pass through the unshielded twisted pairs of wires defining the link such as the link 14.

The signals from the quantizer 112 in FIG. 5 are introduced to the timing recovery stage 66 in FIG. 4. The timing recovery stage provides a fine regulation of the time at which the analog-to-digital converter 42 produces the voltage $V_o$. As a first step in this regulation, the timing recovery stage 66 determines the amount of offset produced in the voltage $V_o$ as a result of the distortion produced in the unshielded twisted pairs of wires constituting the link such as the link 20.

Figure 12:
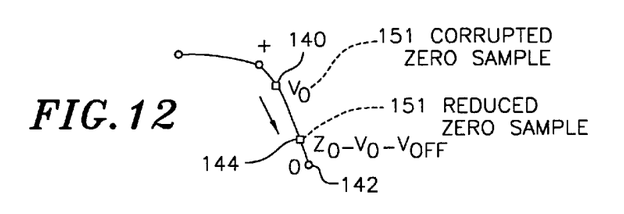
FIG. 12 illustrates the timing offset, made in the voltage assumed at the client to be at a zero crossing in the production of digital signals at the client, to compensate for the phase degradation produced during the passage of signals through the unshielded twisted pair of wires connected between the repeater and the client.

FIG. 12 illustrates the voltage $V_o$ at 140 and illustrates at 142 the "0" indication corresponding to the time at which the clock signal provided by the generator 68 crosses the zero axis. FIG. 12 also illustrates at 144 the shift in phase of the voltage $V_o$ as a result of the offset produced by the unshielded twisted pair of wires constituting the link such as the link 20. This voltage with the shifted phase is designated as $Z_o = V_o - V_{off}$ where $V_{off}$ is the offset voltage resulting from the phase distortion or degradation produced by the unshielded twisted pair of wires constituting the link such as the link 20.

Figure 13:
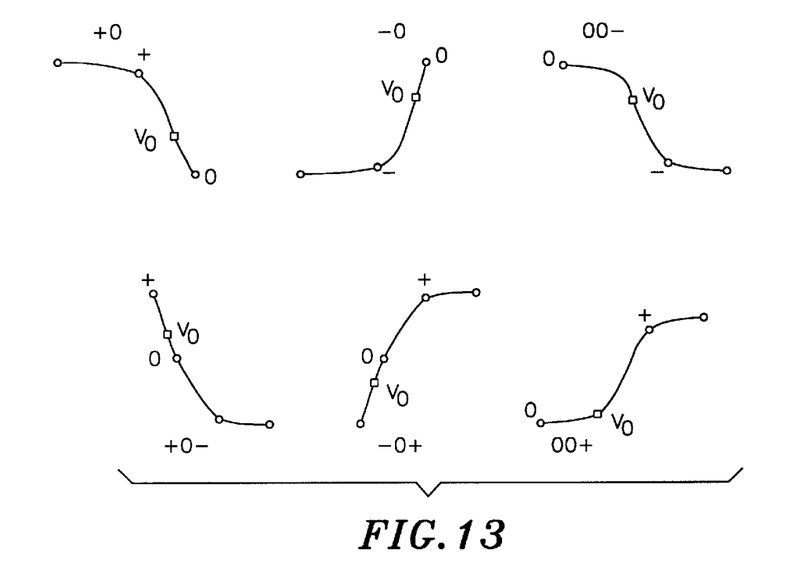
FIG. 13 provides timing relationships similar to those shown in FIG. 11 but including the effects of the offset shown in FIG. 12.

FIG. 13 provides a number of schematic representations similar to those shown in FIG. 11 and discussed above. However, many of the representations include a consideration of the offset voltage $V_o$ discussed in the previous paragraph and shown in FIG. 12. The first condition shown in FIG. 13 is designated as a "+0" transition. In this transition, $V_o - V_{off}$ has a value greater than 0. Furthermore, $V_o - V_{off}$ has a positive value as indicated by the "+" sign above and to the left of $V_o$. Under such circumstances, $V_o$ is shifted to the right—or, from a time standpoint, is delayed—so that $V_o - V_{off}$ will correspond in time to the zero crossing of the clock signals from the generator 68.

If $V_o - V_{off}$ should be negative with the same shape of curve as shown in the "+0" transition in FIG. 13, the $V_o - V_{off}$ indication would be below and to the right of the "0" indication. Under such circumstances, the time for the production of the digital signals by the converter 48 would be moved to the left—or, from a time standpoint, advanced—in FIG. 13 to have $V_o$ coincide in time with the "0" indication.

The second condition in FIG. 13 is designated as a "-0" transition. In this transition, $V_o + V_{off}$ is less than 0. $V_{off}$ is added to $V_o$ in this transition because $V_o$ is negative and the delay represented by $V_{off}$ advances $V_o$ toward a value of 0. In this transition, the "0" indication is above and to the right of the $V_o$ indication. This is indicated by a "−" sign below and to the left of the $V_o$ indication. Under such circumstances, the timing of the $V_o$ indication would be moved to the right—or, from a time standpoint, delayed—in FIG. 13 to have $V_o$ coincide in time with the "0" indication.

If $V_o + V_{off}$ should be greater than 0 with the same shape of curve as shown in the "−0" transition in FIG. 13, the $V_o + V_{off}$ voltage would be above and to the right of the "0" indication in FIG. 13. Under such circumstances, the $V_o$ would be moved to the left—or, from a time standpoint, advanced—in FIG. 13 to have $V_o + V_{off}$ coincide in time with the "0" indication.

The third condition in FIG. 13 is designated as a "+0−" transition. In this transition, $V_o - V_{off}$ is greater than 0. Furthermore, the transition is from a+value to a value of 0 and then to a−value. (This is why it is designated as "+0−".) Under such circumstances, $V_o$ is moved to the right—or, from a time standpoint, delayed—in FIG. 13 to have $V_o$ coincide in time with the "0" indication.

if $V_o-V_{off}$ should be less than 0 with the same shape of curve as shown in the "+0−" transition in FIG. 13, the $V_o-V_{off}$ indication would be below and to the right of the "0" indication. Under such circumstances, the $V_o$ indication would be moved to the left—or, from a time standpoint, advanced—to have $V_o$ coincide in time with the "0" indication.

The fourth condition in FIG. 13 is designated as a "−0+" transition. In this transition, $V_o+V_{off}$ is less than 0. $V_{off}$ is added to $V_o$ in this transition because $V_o$ is negative and the delay represented by $V_{off}$ advances $V_o$ toward a value of 0. Furthermore, the transition is from a−value to a value of 0 and then to a+value. (This is why it is designated as "−0+".) Under such circumstances, $V_o$ is moved to the right—or, from a time standpoint, delayed—to have $V_o$ coincide in time with the "0" indication.

If $V_o+V_{off}$ should be greater than 0 with the same shape of curve as shown in the "−0+" transition in FIG. 13, the $V_o+V_{off}$ indication would be above and to the right of the "0" indication. Under such circumstances, the $V_o$ indication would be moved to the left—or, from a time standpoint, advanced—to have $V_o$ coincide in time with the "0" indication.

The fifth (5th) condition in FIG. 13 is designated as a "00−" transition. (This results from the fact that the first two (2) positions in this transition have values of 0 or values close to 0 and the third position in this transition is negative). The voltage $V_o$ is between the two (2) zero (0) indications and has a value greater than the two (2) zero (0) indications. Under such circumstances, the $V_o$ voltage is moved to the right—or, from a time standpoint, is delayed—to have the $V_o$ voltage correspond in time with the second of the two zero (0) indications.

If $V_o$ should be less than the two 0 indications with the same shape of curve as shown in the "00−" transition in FIG. 13, the $V_o$ voltage should be below and to the right of the second of the two zero (0) indications. Under such circumstances, the $V_o$ voltage is moved to the left—or, from a time standpoint, advanced—in FIG. 13 to have the $V_o$ voltage correspond in time with the second of the two zero (0) indications.

The sixth condition in FIG. 13 is designated as a "00+" transition. (This results from the fact that the first two (2) positions in this transition have values of 0 or values close to 0 and the third position in this transition is positive.) The voltage $V_o$ is between the two zero (0) indications and has a value less than the two zero (0) indications. Under such circumstances, the $V_o$ voltage is moved to the right—or, from a time standpoint, delayed—to have the $V_o$ voltage correspond in time with the second of the two zero (0) indications.

If $V_o$ should be greater than the two zero (0) indications, with the same shape of curve as shown in the "00+" transition in FIG. 13, the $V_o$ voltage would be above and to the right of the second of the two zero (0) indications. Under such circumstances, the $V_o$ voltage is moved to the left—or, from a time standpoint, advanced—to have the $V_o$ voltage correspond in time with the second of the two zero (0) conditions.

The system and method of this invention have certain important advantages. They provide a conversion of the received analog signals to digital signals. They provide for a processing of the digital signals by the timing recovery stage 66 to have the digital conversions occur at the zero crossings of a reference clock signal generated by the generator 68. In this way, the analog signals can be sampled digitally at the times at which the amplitudes of the analog signals represent individual ones of analog levels +1, 0 and −1. This processing of the digital signals by the timing recovery stage 66 initially provides a coarse regulation of the time for the digital conversions by the converter 48.

Subsequently the equalizer 64 operates upon the digital signals from the converter 48 to determine whether the amplitudes of the digital signals have analog values of +1, 0 or −1. The operation of the equalizer 64 to determine the amplitudes of the digital signal is facilitated by the inclusion of the high pass filter 100 and the canceller 112 to limit the length of the tail in the digital signals. The timing recovery stage 66 then provides fine regulation of the signals from the equalizer 64 to have the digital processing by the converter 48 occur at the zero crossings of the clock signals from the clock signal generator 68.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. In combination for operating upon digital signals provided at a particular frequency, which digital signals have been scrambled and encoded and then converted to analog signals to recover the information represented by such digital signals, first means for providing clock signals at the particular frequency, second means for converting the analog signals to digital signals at the particular frequency, third means responsive to the clock signals and to the digital signals for initially providing a coarse adjustment in the times at which the analog signals are converted to the digital signals to obtain a zero value for the digital signals at the zero crossings of the clock signals;

an equalizer for providing signals for eliminating the effects, from each individual one of the digital signals, of the digital signals adjacent in time to such individual one of the digital signals, fourth means responsive to the initial operation of the third means for activating the equalizer, and fifth means responsive to the activation of the equalizer for providing a fine adjustment in the times at which the analog signals are converted to the digital signals to obtain a zero value for the digital signals at the zero crossings of the clock signals.

2. In a combination as set forth in claim 1 wherein the equalizer includes a feed forward equalizer for eliminating from each digital signal the effects on such digital signal from previous digital signals and wherein, each digital signal includes a tail and wherein the equalizer includes a decision feedback equalizer for eliminating the tail from each digital signal.

3. In combination as set forth in claim 2 wherein the third means is operative to adjust the time for the conversion of the analog signals to the digital signals to have such time coincide with the time for the production of the zero voltage in the clock signals, a link extends from the position of the encoding to the position of the second means and wherein the fifth means compensates for the length of the link in providing the adjustment in the times at which analog signals are converted to the digital signals to have such time coincide with the zero crossing of the clock signals.

4. In a combination as set forth in claim 1 wherein the third means is responsive to the clock signals and to the relative timing of the zero voltage in the clock signals and the digital voltage at the time of the conversion of the analog signals to the digital signals and responsive to the polarity of the difference between the zero voltage in the clock signals and the digital voltage at the time of the conversion of the analog signals to the digital signals for adjusting the timing of the conversion of the digital signals in a direction to minimize the time between the zero voltage in the clock signals and the conversion of the analog signals to the digital signals.

5. In a combination as set forth in claim 1 wherein the third means is operative to adjust the time for the conversion of the analog signals to the digital signals to have such time coincide with the time for the production of the zero voltage in the clock signals.

6. In a combination as set forth in claim 1 wherein a link extends from the position of the encoding to the position of the second means and wherein the fifth means compensates for the length of the link in providing the adjustment in the time at which analog signals are converted to the digital signals to obtain the coincidence between such conversion and the zero crossing of the clock signals.

7. In combination for operating upon digital signals provided at a particular frequency and representing information, which digital signals have been scrambled and encoded and then converted to analog signals, to recover the information represented by the digital signals, first means for providing clock signals at the particular frequency, second means for converting the analog signals to digital signals at the particular frequency, third means responsive to the clock signals and the digital signals for providing coarse adjustments in the phase of the digital signals to obtain a correspondence in phase between the digital signals and the clock signals, fourth means responsive to the digital signals for minimizing, in each individual one of the digital signals, the responses on such individual one of the digital signals of adjacent ones of the digital signals, and fifth means responsive to the digital signals from the fourth means for providing fine adjustments in the phase of the digital signals to obtain a correspondence in phase between the digital signals and the clock signals.

8. In a combination as set forth in claim 7 wherein the third means is initially operative without an operation of the fourth and fifth means and wherein the fourth and fifth means are subsequently operative without an operation of the third means.

9. In a combination as set forth in claim 8 wherein the digital signals from the second means have leading and trailing portions and wherein the fourth means includes a first equalizer responsive to the digital signals from the second means for minimizing, in the leading portion of each individual one of the digital signals, the responses of the adjacent digital signals and for minimizing, in the trailing portion of each individual one of the digital signals, the responses of the adjacent digital signals and wherein a high pass filter operates to limit the length of the post-cursor response before the introduction of the digital signals to the second equalizer and wherein a tail canceller is included to predict the shape of the trailing end of the post-cursor response and to provide a signal with such predicted shape to cancel the trailing end of the post-cursor response and wherein the third means determines the phase of the digital signals at assumed zero crossings of such digital signals relative to the phase of the zero crossings of the clock signals and adjusts the phase of the assumed zero crossings to coincide with the phase of the zero crossings of the clock signals and wherein a link is provided between the position of converting the analog signals and the second means and wherein an offset is provided in the phase of the digital signals to compensate for the effect of the link on the digital signals and wherein the fifth means determines the offset in the phase of the digital signals relative to the zero crossings of the clock signals and adjusts the phase of the digital signals to coincide with the phase of the zero crossings of the clock signals.

10. In a combination as set forth in claim 7 wherein the digital signals from the second means have leading and trailing portions and wherein the fourth means includes a first equalizer responsive to the digital signals from the second means for minimizing, in the leading portion of each individual one of the digital signals, the responses of the adjacent digital signals and for minimizing, in the trailing portion of each individual one of the digital signals, the responses of the adjacent digital signals.

11. In a combination as set forth in claim 7 wherein each of the digital signals has a relatively short pre-cursor response and a relatively long post-cursor response and wherein a first equalizer operates to inhibit the short pre-cursor response and a second equalizer operates to inhibit the long post-cursor response and wherein a high pass filter operates to limit the length of the post-cursor response before the introduction of the digital signals to the second equalizer.

12. In a combination as set forth in claim 11 wherein a tail canceller is included to predict the shape of the trailing end of the post-cursor response and to provide a signal with such predicted shape to cancel the trailing end of the post-cursor response.

13. In a combination as set forth in claim 7 wherein the third means determines the phase of the digital signals at assumed zero crossings of such digital signals relative to the phase of the zero crossings of the clock signals and adjusts the phase of the assumed zero crossings to coincide with the phase of the zero crossings of the clock signals.

14. In a combination as set forth in claim 7 wherein a link is provided between the position of conversion of the digital signals and the second means and wherein an offset is provided in the phase of the digital signals to compensate for the effect of the link on the digital signals and wherein the fifth means determines the offset in the phase of the digital signals relative to the zero crossings of the clock signals and adjusts the phase of the digital signals to coincide with the phase of the zero crossings of the clock signals.

15. In combination for operating upon digital signals provided at a particular frequency, which digital signals have been scrambled and encoded and then converted to analog signals, to recover the information represented by such digital signals, first means for providing clock signals at the particular frequency, second means for converting the analog signals to digital signals at the particular frequency, there being a link between the position of converting to the analog signals and the second means, the digital signals having pre-cursor and post-cursor responses, third means for offsetting the phase of the digital signals in accordance with the characteristics of the link, fourth means responsive to the digital signals with the offset phase for limiting the pre-cursor and post-cursor responses, and fifth means for adjusting the offset phases of the digital signals to have the times for the zero crossings of the digital signals correspond to the times for the zero crossings of the clock signals.

16. In a combination as set forth in claim 15 wherein the fourth means includes a first equalizer for inhibiting the pre-cursor response in the digital signals and includes a second equalizer for inhibiting the post-cursor response in the digital signals.

17. In a combination as set forth in claim 16, a high pass filter operative to limit the length of the post-cursor response before the operation of the second equalizer.

18. In a combination as set forth in claim 17, a tail canceller for limiting the length of the post-cursor response, a first adder for combining the outputs of the second equalizer and the tail canceller, a second adder for combining the outputs of the first and second equalizers, and a quantizer responsive to the output of the second adder at each instant for selecting, for each of the digital signals, a particular one of a plurality of digital values closest to the output of the second adder at that instant and for using the selected one of the digital values as the peak value of the digital signal at that instant, the fifth means being operative to determine the polarity of the value of the digital signals at times assumed for the zero crossing of the digital signals and to determine the relative times of occurrence of the assumed zero crossings of the digital signals and the zero crossings of the clock signals and to adjust the times assumed for the zero crossings of the digital signals in accordance with such determinations to have the times assumed for the zero crossings of the digital signals coincide with the times for the zero crossings of the clock signals.

19. In a combination as set forth in claim 16, a tail canceller for limiting the length of the post-cursor response, and an adder for combining the outputs of the second equalizer and the tail canceller.

20. In a combination as set forth in claim 16, an adder for combining the outputs of the first and second equalizers, and a quantizer responsive to the output of the adder at each instant for selecting, in each of the digital signals, a particular one of a plurality of digital values closest to the output of the adder at that instant and for using the selected one of the digital values as the peak value of such digital signal at that instant.

21. In a combination as set forth in claim 16, wherein the fifth means determines the polarity of the digital signals at times assumed for the zero crossings of the digital signals and determines the relative times of occurrence of the assumed zero crossings of the digital signals and the zero crossings of the clock signals and adjusts the times assumed for the zero crossings of the digital signals in accordance with such determinations to have the times assumed for the zero crossings of the digital signals coincide with the times for the zero crossings of the clock signals.

22. In combination for operating upon digital signals provided at a particular frequency, which digital signals have been scrambled and encoded and then converted to analog signals, to recover the information represented by such digital signals, first means for providing clock signals at the particular frequency, second means for converting the analog signals to digital signals at the particular frequency, third means responsive to the digital signals for providing a value of zero for the digital signals when the digital signals have a value within particular limits and for providing a value of +1 for positive values of the digital signals above the particular limits and for providing a value of −1 for negative values of the digital signals below the particular limits, and fourth means for determining the times for the changes of the digital signals between the digital values of +1, 0 and −1 relative to the times for the zero crossings of the clock signals and for determining the polarity of the digital signals between such relative times and for changing the times for the production of the digital values of +1, 0 and −1 in accordance with such determinations.

23. In a combination as recited in claim 22 wherein the analog signals are provided at a particular position and wherein a link is provided between the particular position and the second means and wherein fifth means are provided for offsetting the time for the occurrence of the digital signals representing +1, 0 and −1 in accordance with the characteristics of the link.

24. In a combination as set forth in claim 23 wherein a link is provided between the position of providing the analog signals and the second means and wherein means are provided for offsetting the time for the occurrence of the digital signals representing +1, 0 and −1 in accordance with the characteristics of the link and wherein sixth means are provided for determining the offset times for the changes of the digital signals between the digital values of +1, 0 and −1 relative to the times for the zero crossings of the clock signals and for determining the polarity of the digital signals between such relative times and for changing the times for the production of the digital values between +1, 0 and −1 in accordance with such determinations.

25. In a combination as set forth in claim 24 wherein the sixth means is operative after the operation of the fourth means and wherein the digital signals include a pre-cursor response and a post-cursor response and wherein seventh means are provided for minimizing the pre-cursor response and the post-cursor response after the operation of the fourth means but before the operation of the sixth means.

26. In a combination as set forth in claim 25 wherein the seventh means includes a first equalizer for minimizing the pre-cursor response and a second equalizer for minimizing the post-cursor response and a quantizer operatively coupled to the first and second equalizers for selecting an individual one of the values of +1, 0 and −1 for each of the digital signals in accordance with the magnitude of the digital signals relative to the particular limits and wherein the seventh means additionally includes a high pass filter and a tail canceller for limiting the time duration of the post-cursor response for each of the digital signals.

27. In a combination as set forth in claim 22 wherein the digital signals include a pre-cursor response and a post-cursor response and wherein fifth means are provided for minimizing the pre-cursor response and the post-cursor response after the operation of the fourth means.

28. In a combination as set forth in claim 27 wherein the digital signals include a pre-cursor response and a post-cursor response and wherein sixth means are provided for minimizing the pre-cursor response and the post-cursor response and wherein the sixth means includes a first equalizer for minimizing the pre-cursor response and a second equalizer for minimizing the post-cursor response and a quantizer operatively coupled to the first and second equalizers for selecting an individual one of the values of +1, 0 and −1 for each of the digital signals in accordance with the magnitude of the digital signals relative to the particular limits.

29. In combination for use in a system providing first signals having individual ones of a plurality of analog levels to represent information, a repeater, a plurality of clients, pairs of unshielded twisted wires, each pair being disposed between the repeater and an individual one of the clients to transmit the first signals between the repeater and the individual one of the clients, first means at each of the clients for receiving from the repeater the first signals having individual ones of the plurality of amplitude levels, second means at each of the clients for providing clock signals at a particular frequency, third means at each of the clients for converting to digital signals the first signals having the individual ones of the different amplitude levels, and fourth means at each of the clients for adjusting the times of the digital conversions of the first signals having the different amplitude levels in accordance with the phase differences between the zero crossings of the clock signals and the digital conversions of the first signals.

30. In a combination as set forth in claim 29 wherein a plurality of two pairs of unshielded twisted wires are provided and wherein each of the two pairs of the unshielded twisted wires is connected between the receiver and an individual one of the clients, one of the pairs providing for the transmission of information from the receiver to the individual one of the clients and the other of the pairs providing for the transmission of information from the individual one of the clients to the receiver.

31. In a combination as set forth in claim 30, wherein the pairs of the unshielded twisted wires between the receiver and the individual ones of the clients have impedance characteristics dependent upon the lengths of such wires and wherein means are provided at each of the clients for offsetting the times of the digital conversions of the first signals in accordance with the impedance characteristics of the unshielded twisted pairs of wire between the repeaters and such clients.

32. In a combination as set forth in claim 31, wherein the pairs of the unshielded twisted wires between the receiver and the individual ones of the clients have impedance characteristics dependent upon the lengths of such wires and wherein means are provided for offsetting the times of the digital conversions of the first signals at each of the clients in accordance with the impedance characteristics of the unshielded twisted pairs of wires between the repeater and such client.

33. In a combination as set forth in claim 32, there being unshielded twisted pairs of wires between the repeater and each of the clients, and means at each of the clients for offsetting the phase of the digital signals from the quantizer at such client, before the fine adjustments in the phase of these signals at such client, in accordance with the characteristics of the unshielded twisted pairs of wires between the repeater and such client, to have the zero crossings of these signals coincide in phase with the zero crossings of the clock signals at such client.

34. In a combination as set forth in claim 30, wherein the digital conversions of the first signals at each of the clients have a pre-cursor response and a post-cursor response and wherein, first equalizer means are provided at each of the clients for limiting the pre-cursor response at such client and wherein second equalizer means are provided at each of the clients for limiting the post-cursor response at such client.

35. In a combination as set forth in claim 29, wherein the fourth means at each of the clients includes fifth means for initially providing a coarse adjustment in the times of the digital conversions of the first signals in accordance with the phase differences between the zero crossings of the clock signals and the digital conversions of the first signals and wherein the fourth means at each of the clients includes sixth means for subsequently providing fine adjustments in the times of the digital conversions of the first signals at such client in accordance with the phase differences between the zero crossings of the clock signals and the digital conversions of the first signals.

36. In a combination as recited in claim 35 wherein a plurality of two pairs of unshielded twisted wires are provided and wherein each of the two pairs of the unshielded twisted wires is connected between the receiver and an individual one of the clients, one of the pairs providing for the transmission of information from the receiver to the individual one of the clients and the other of the pairs providing for the transmission of information from the individual one of the clients to the receiver and wherein the pairs of the unshielded twisted wires between the receiver and the individual ones of the clients have impedance characteristics dependent upon the lengths of such wires and wherein means are provided at each of the clients for offsetting the times of the digital conversions of the first signals in accordance with the impedance characteristics of the unshielded twisted pairs of wire at such client and wherein the digital conversions of the first signals at each of the clients have a pre-cursor response and a post-cursor response and wherein first equalizer means are provided at each of the clients for limiting the pre-cursor response at such client and wherein second equalizer means are provided at each of the clients for limiting the post-cursor response at such client and wherein an adaptive threshold is provided and wherein the outputs of the first equalizer means and the second equalizer means at each of the clients are introduced to an adder at such client and wherein the output of the adder at each of the clients is introduced to a quantizer at such client for selecting the individual one of the analog levels in the plurality for each of the digital signals at such client in accordance with the amplitude and polarity of such digital signal relative to the adaptive threshold and wherein the information at each of the clients is provided by the sequence of the amplitude levels from the quantizer at such client.

37. In a combination as set forth in claim 36, including, a high pass filter responsive at each of the clients to the digital signals provided by the third means for limiting the post-cursor response before the introduction of the digital signals to the first and second equalizer means at such client, and a tail canceller at each of the clients for attenuating the post-cursor response beyond a particular time for each of the digital signals at such client.

38. In a method of operating upon digital signals provided at a particular frequency, which digital signals have been scrambled and encoded and then converted to analog signals, to recover the information represented by such digital signals, the steps of:

providing clock signals at the particular frequency, converting the analog signals to digital signals at the particular frequency, converting the magnitude of each of the digital signals to the individual one of a plurality of amplitude values closest in value to the magnitude of such digital signal, and determining the times for the changes of the digital signals between the individual one of the plurality of amplitude values relative to the times for the zero crossings of the clock signals to have the times for such changes coincide with the times for the zero crossings of the clock signals.

39. In a method as set forth in claim 38 wherein the amplitude values in the plurality are +1, 0 and −1 and wherein the step of converting involves the conversion of the magnitude of each of the digital signals to the individual one of the amplitudes +1, 0 and −1 closest in value to the magnitude of such digital signal.

40. In a method as set forth in claim 38 wherein the analog signals are provided at a first particular position and wherein the analog signals are converted to digital signals at a second particular position displaced from the first particular position and wherein a link is provided between the first and second particular positions and wherein the time for determining the changes of the digital signals between the individual ones of the plurality of amplitude values relative to the times for the zero crossings of the clock signals are offset by the characteristics of the link.

41. In a method as set forth in claim 40 wherein the digital signals include a pre-cursor response and a post-cursor response and wherein the pre-cursor response and the post-cursor response in the digital signals are minimized before the step of determining the times for the changes of the digital signals between the individual ones of the plurality of amplitude values relative to the times for the zero crossings of the clock signals and wherein the amplitude values in the plurality are +1, 0 and −1 and wherein the step of converting involves the conversion of the magnitude of each of the digital signals to the individual one of the amplitudes +1, 0 and −1 closest in value to the magnitude of such digital signal.

42. In a method as set forth in claim 38 wherein the digital signals include a pre-cursor response and a post-cursor response and wherein the pre-cursor response and the post-cursor response in the digital signals are minimized before the step of determining the times for the changes of the digital signals between the individual ones of the plurality of amplitude values relative to the times for the zero crossings of the clock signals.

43. In a method of operating upon digital signals provided at a particular frequency, which digital signals have been scrambled and encoded and then converted to analog signals, to recover the information represented by such digital signals, the steps of:

providing clock signals at the particular frequency, converting the analog signals to digital signals at the particular frequency, initially providing coarse adjustments in the phases at which the digital signals are produced thereby to have the times for the digital crossings of the digital signals coincide with the times for the zero crossings of the clock signals, and subsequently providing fine adjustments in the phases at which the digital signals are produced thereby to have the times for the digital crossings of the digital signals coincide with the times for the zero crossings of the clock signals.

44. In a method as set forth in claim 43 wherein the digital signals have a pre-cursor response and a post-cursor response and wherein the pre-cursor response and the post-cursor response are minimized in the period between the coarse and fine adjustments in the time at which the digital signals are produced.

45. In a method as set forth in claim 44 wherein the magnitude of each of these digital signals is adjusted, in the period of time between the coarse and fine adjustments in the phases of the digital signals, to provide an individual one of a plurality of amplitudes closest in value to such magnitude of such individual one of the digital signals.

46. In a method as set forth in claim 43 wherein the magnitude of each of these digital signals is adjusted, in the period of time between the coarse and fine adjustments in the phases of the digital signals, to provide an individual one of a plurality of amplitudes closest in value to such magnitude of such individual one of the digital signals.

47. In combination for operating upon digital signals provided at a particular frequency, which digital signals have been scrambled and encoded and then converted to analog signals, to recover the information represented by such digital signals, first means for providing clock signals at the particular frequency, second means for converting the analog signals to digital signals at the particular frequency, the digital signals having a pre-cursor response and a post-cursor response, a feed forward equalizer for producing signals inhibiting the pre-cursor response, a decision feedback equalizer for producing signals inhibiting the post-cursor response, an adder for combining the signals from the feed forward equalizer and the decision feedback equalizer to provide resultant signals, a high pass filter for producing signals limiting the time duration of the post-cursor response before the introduction of the digital signals to the feed forward equalizer, a tail canceller responsive to the digital signal from the feed forward equalizer for producing signals further limiting the time duration of the post-cursor response in the digital signals, a quantizer responsive to the resultant signals from the adder for providing digital signals representing values of +1, 0 and −1 in accordance with the amplitudes of the resultant signals from the first adder, and means responsive to the signals from the quantizer for adjusting the phase of such signals to have the zero crossings of these signals coincide in phase with the zero crossings of the clock signals.

48. In combination for operating upon digital signals provided at a particular frequency, which digital signals have been scrambled and encoded and then converted to analog signals, to recover the information represented by such digital signals, first means for providing clock signals at the particular frequency, second means for converting the analog signals to digital signals at the particular frequency, the digital signals having a pre-cursor response and a post-cursor response, a feed forward equalizer for producing signals inhibiting the pre-cursor response, a decision feedback equalizer for producing signals inhibiting the post-cursor response, an adder for combining the signals from the feed forward equalizer and the decision feedback equalizer to provide resultant signals, a high pass filter for producing signals limiting the time duration of the post-cursor response before the introduction of the digital signals to the feed forward equalizer, a tail canceller responsive to the digital signal from the feed forward equalizer for producing signals further limiting the time duration of the post-cursor response in the digital signals, a quantizer responsive to the resultant signals from the adder for providing digital signals representing values of +1, 0 and −1 in accordance with the amplitudes of the resultant signals from the first adder, the adder constituting a first adder, a second adder responsive to the output signals from the decision feedback equalizer and the tail canceller for producing signals for introduction to the first adder for combination with the signals from the feed forward equalizer to produce the resultant signals, means for introducing the signals from the quantizer to the decision feedback equalizer for the production by the decision feedback equalizer of the digital signals inhibiting the post-cursor response, means initially responsive to the digital signals from the second means before the introduction of such digital signals to the high pass filter for providing a coarse adjustment in the phase of these digital signals to have the zero crossings of these digital signals coincide in phase with the zero crossings of the clock signals, and means subsequently responsive to the digital signals from the quantizer for providing a fine adjustment in the phase of these signals to have the zero crossings of these digital signals coincide in phase with the zero crossings of the clock signals.

49. In combination for use in a system providing first signals having individual ones of a plurality of analog levels to represent information, a repeater, a plurality of clients, pairs of unshielded twisted wires, each pair being disposed between the repeater and an individual one of the clients to transmit the first signals between the repeater and the individual one of the clients, first means in each of the clients for receiving the first signals from the repeater, second means for providing clock signals at a particular frequency, third means for converting the first signals to digital signals, the digital signals having a pre-cursor response and a post-cursor response, a feed forward equalizer at each of the clients for providing an output inhibiting the pre-cursor response in the digital signals from the third means at such client, a decision feedback equalizer at each of the clients for providing an output inhibiting the post-cursor response in the digital signals from the third means at such client, a tail canceller at each of the clients for providing an output limiting the duration of the post-cursor response of the digital signals at such client, a first adder at each of the clients for combining the outputs from the feed forward equalizer and the tail canceller to obtain first resultant signals at such client, a second adder at each of the clients for combining the output from the feed forward equalizer and the first resultant signals from the first adder to produce second resultant signals indicative of the information represented by the first signals, a quantizer responsive at each of the clients to the second resultant signals from the second adder at such client for selecting for each of the second resultant signals a magnitude indicative of an individual one of a plurality of amplitudes closest in magnitude to each of the second resultant signals, means responsive to the magnitudes selected by the quantizer for each of the digital signals for introducing such magnitudes as the digital signals to the decision feedback equalizer, and means responsive at each of the clients to the magnitude of the second resultant signals from the second adder for adjusting the phase of the second resultant signals to have the zero crossings of the second resultant signals coincide in phase with the zero crossings of the clock signals at such client.

50. In combination for use in a system providing first signals having individual ones of a plurality of analog levels to represent information, a repeater, a plurality of clients, pairs of unshielded twisted wires, each pair being disposed between the repeater and an individual one of the clients to transmit the first signals between the repeater and the individual one of the clients, first means in each of the clients for receiving the first signals from the repeater, second means for providing clock signals at a particular frequency, third means for converting the first signals to digital signals, the digital signals having a pre-cursor response and a post-cursor response, a feed forward equalizer at each of the clients for providing an output inhibiting the pre-cursor response in the digital signals from the third means at such client, a decision feedback equalizer at each of the clients for providing an output inhibiting the post-cursor response in the digital signals from the third means at such client, a tail canceller at each of the clients for providing an output limiting the duration of the post-cursor response of the digital signals at such client, a first adder at each of the clients for combining the outputs from the feed forward equalizer and the tail canceller to obtain first resultant signals at such client, a second adder at each of the clients for combining the output from the feed forward equalizer and the first resultant signals from the first adder to produce second resultant signals indicative if the information represented by the first signals, a quantizer responsive at each of the clients to the second resultant signals from the second adder at such client for selecting for each of the second resultant signals magnitude indicative of an individual one of a plurality of amplitudes closest in magnitude to each of the second resultant signals, means responsive to the magnitudes selected by the quantizer for each of the digital signals for introducing such magnitudes as the digital signals to the decision feedback equalizer, a high pass filter at each of the clients for receiving the digital signals from the third means at such client and for passing the high frequency components of such digital signals to the feed forward equalizer as inputs to the feed forward equalizer at such client, means initially responsive at each of the clients to the digital signals from the third means before the introduction of these signals to the high pass filter at such client for providing a coarse adjustment in the phase of these signals to have the zero crossings of these signals coincide in phase with the zero crossings of the clock signals at such client and, means subsequently responsive at each of the clients to the digital signals from the quantizer at such client for providing a fine adjustment in the phase of these signals to have the zero crossings of these signals coincide in phase with the zero crossings of the clock signals at such client.

51. In a combination as set forth in claim 50, there being unshielded twisted pairs of wires between the repeater and each of the clients, and means at each of the clients for offsetting the phase of the digital signals from the quantizer at such client, before the fine adjustment in phase of these digital signals at such client, in accordance with the characteristics of the unshielded twisted pairs of wires between the repeater and such client to have the zero crossings of these signals coincide in phase with the zero crossings of the clock signals at such client.

* * * * *